(12) United States Patent
Yamaguchi

(10) Patent No.: US 7,119,935 B2
(45) Date of Patent: Oct. 10, 2006

(54) LIGHT SCANNING UNIT FOR USE IN IMAGE FORMING APPARATUS

(75) Inventor: Masao Yamaguchi, Tokyo (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 492 days.

(21) Appl. No.: 10/401,879

(22) Filed: Mar. 31, 2003

(65) Prior Publication Data

US 2004/0190099 A1    Sep. 30, 2004

(51) Int. Cl.
*G02B 26/08* (2006.01)
(52) U.S. Cl. ..................................... 359/212
(58) Field of Classification Search ........ 359/205–208, 359/212, 216
See application file for complete search history.

(56) References Cited

U.S. PATENT DOCUMENTS

| 6,229,638 B1 * | 5/2001 | Sakai et al. ................. 359/212 |
| 6,381,078 B1 | 4/2002 | Yamaguchi et al. |
| 2003/0020801 A1 | 1/2003 | Yamaguchi et al. |

FOREIGN PATENT DOCUMENTS

| JP | 9-127444 A | 5/1997 |
| JP | 2001-91873 A | 4/2001 |
| JP | 2002-328323 A | 11/2002 |

* cited by examiner

*Primary Examiner*—Euncha P. Cherry
(74) *Attorney, Agent, or Firm*—Foley & Lardner LLP

(57) ABSTRACT

A light scanning unit according to the present invention can decrease the degree of change when the quantity of light is changed on a photoconductor, thereby decreasing an image density difference occurred when forming an image.

13 Claims, 5 Drawing Sheets

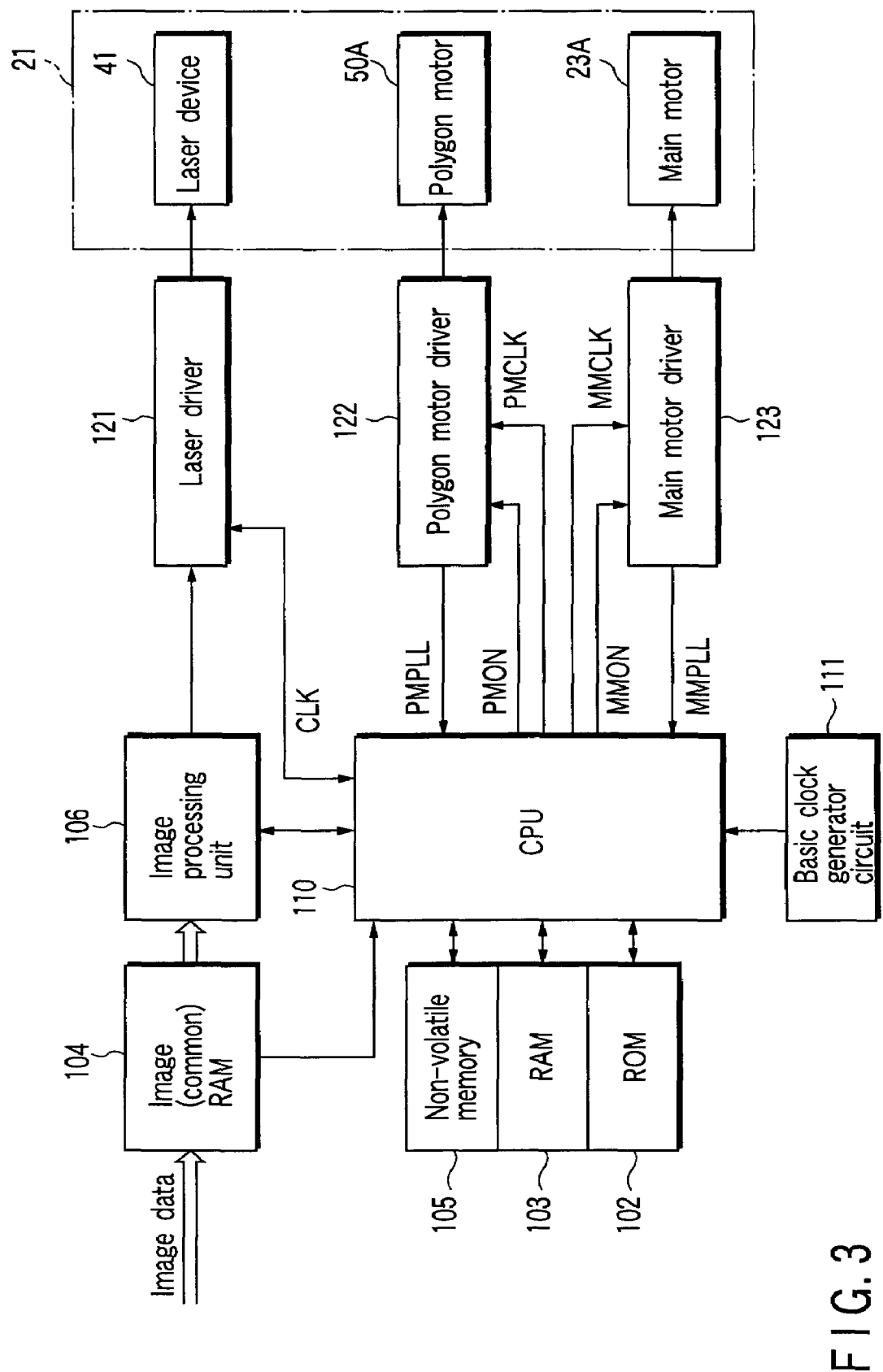
F I G. 3

LIGHT SCANNING UNIT FOR USE IN IMAGE FORMING APPARATUS

BACKGROUND OF THE INVENTION

The present invention relates to a light scanning unit used in a laser printer or a digital copier, for example, and more particularly a light scanning unit of the over-illumination type in which the width of the main scanning direction of a luminous flux incident on a polygon mirror (the direction along the polygon mirror rotating direction) is wider than the width of the reflecting surface in the polygon mirror in the main scanning direction.

As a light scanning unit of the over-illumination type by the inventor of this application, there is the one discloses by Jpn. Pat. Appln. KOKAI Publication No. 2002-328323=U.S. patent application Ser. No. 10/131,207 (Filed 25 Apr. 2002).

In the above-mentioned over-illumination type light scanning unit, the width of the main scanning direction of a light beam deflected by a polygon mirror changes depending on the scanning angle (position angle), as explained in the above-mentioned previous application.

However, even in the previous application by the inventor of the present application, it is not completely solved that when the light beam incident on the polygon mirror forms an angle on the main scanning plane with respect to the optical axis of the image forming optics (when the light beam enters obliquely), the variation in the beam section diameter becomes asymmetrical with respect to the center of the optical axis of the image forming optics.

Further, it is also as proposed by the inventor of the present application that when a light beam is applied to an optional reflecting surface or a polygon mirror from the front (close to the front) of the main scanning direction in order to decrease the variations in the beam section diameter on the image surface (photodetector), and the light beam reciprocating between the optional reflecting surface of the polygon mirror and a group of lenses provided between the polygon mirror and the photodetector is applied to the image area of a photoconductor to form the image, the degradation of the image quality can be suppressed by a certain degree by providing antireflection coating on the surface of an optional lens. However, there is a problem of deterioration in the lens surface precision and optical characteristics, in addition to an increase in the lens cost.

BRIEF SUMMARY OF THE INVENTION

It is an object of the present invention is to decrease the variation in the light beam diameter in an image area, and improve the image quality, in a light scanning unit of the over-illumination type.

The present invention provides a light scanning unit comprising:

a first optics which shapes the cross section of a luminous flux emitted from a light source to a predetermined shape;

a light deflecting unit which has at least one reflecting surface, and deflects the luminous flux shaped by the first optics in a first direction, wherein the length of the luminous flux including a polarizing light along the first direction is wider than the length of the one reflecting surface along the first direction;

a second optics which forms an image of the luminous flux deflected in the first direction by the light deflecting unit on an scanning object; and an image forming optics to which the luminous flux is guided with the polarizing direction not parallel to a second direction orthogonal to the first direction.

The present invention provides a light scanning unit comprising:

a light source which can output a linearly polarized light with the polarizing direction directed to a predetermined direction;

an image forming unit which is given a predetermined length in a first direction, and a predetermined thickness in a direction orthogonal to the first direction, respectively, and forms an image of the linearly polarized light from the light source, entering from the direction orthogonal to each of the first and second directions, at a predetermined position almost linearly along the first direction;

a deflecting unit which has at least one reflecting surface, the reflecting surface formed long in the first direction, and can continuously reflect the linearly polarized light from the light source, along the first direction and toward the predetermined position in the image forming unit, by changing the angle of the reflecting surface, wherein the length of the linearly polarized light from the light source in the first direction is longer than the length of the reflecting surface in the first direction; and an optical unit which is located between the light source and the deflecting unit, adjusts the cross section of the linearly polarized light from the light source to a predetermined shape, and guides the light to the at least one reflecting surface of the deflecting unit.

Further, the present invention provides an image forming apparatus comprising:

an image holder which can hold an image corresponding to distribution of light by changing a predetermined electric potential, when light is radiated in a state given with the electric potential;

an exposing unit which has a light source capable of emitting light whose polarizing direction is linear and linearly polarized light is directed to a predetermine direction, a first optics which shapes the cross section of a luminous flux emitted from the light source to a predetermined shape, a light deflecting unit which has at least one reflecting surface and deflects the luminous flux shaped by the first optics in a first direction, a second optics which forms an image of the luminous flux deflected in the first direction by the light deflecting unit at a scanning object, and a light scanning unit in which the length of the luminous flux deflected by the light deflecting unit along the first direction is wider than the length of the one reflecting surface of the light deflecting unit along the first direction, and the polarizing direction of the luminous flux guided to an image forming optics is not parallel to a second direction orthogonal to the first direction; and a developing unit which makes the image held by the image holder visible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic block diagram showing an example of a criving circuit of a digital copier including the light scanning unit shown in FIGS. 2A and 2B;

DETAILED DESCRIPTION OF THE INVENTION

Hereinafter, embodiments of the present invention will be explained in detail with reference to the accompanied drawings.

Figure 1:
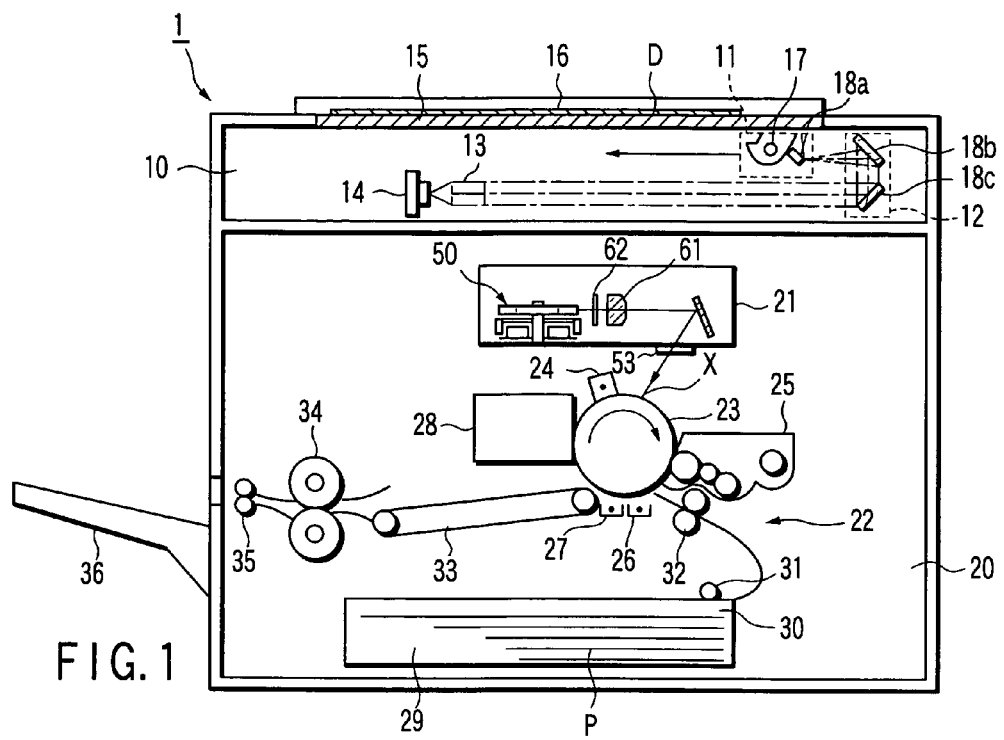
FIG. 1 is a schematic illustration showing an example of an image forming apparatus which cooperates a light scanning unit, that is, an embodiment of the present invention.

As shown in FIG. 1, a digital copier 1 which incorporates a light scanning unit of the present invention has a scanner unit 10 as an image reading means and a printer unit 20 as an image forming means, for example.

The scanner unit 10 has a first carriage 11 formed movable in the arrow direction, a second carriage 12 which is moved following the first carriage 11, an optical lens 13 which gives a predetermined image forming characteristic to the light from the second carriage, an opto-electric conversion element which opto-electrically convert the light given the predetermined characteristic by the optical lens 13 and outputs an electric signal, a document table 15 to hold a document D, and document fixing cover 16 to press the document D to the document table 15.

The first carriage 11 is provided with a light source 17 to illuminate the document D, and a mirror 18a to reflect the light illuminated by the light source 17 and reflected on the document D toward the second carriage 12.

The second carriage 12 is provided with a mirror 18b to bend 90° the light transmitted from the mirror 18a of the first carriage 11, and a mirror 18c to bend further 90° the light bent by the mirror 18b.

The document D placed on the document table 15 is illuminated by the light source 17, and reflects a reflected light including the distribution of light and shade corresponding to existence of an image. The reflected light from the document D is applied to the optical lens 13 as the image information of the document D through the mirrors 18a, 18b and 18c. The reflected light from the document D guided to the optical lens 13 is condensed on the light receiving surface of the opto-electric conversion element (CCD sensor) 14 by the optical lens 13.

When the start of image forming is inputted from a not-shown operation panel or an external unit, the first carriage 11 and second carriage 12 are moved by a not-shown carriage drive motor once to the home position defined to be a predetermined position with respect to the document table 15, and then moved long the document table 15 at a predetermined speed. Thus, the image information of the document D, or the image light reflected from the document D is cut out in a predetermined width along the mirror 18a extending direction, or the main scanning direction, and reflected toward the mirror 18b, and at the same time the image light is sequentially taken out in units of the width cut out by the mirror 18a with respect to the direction orthogonal to the mirror 18a extending direction, or the subsidiary scanning direction. Therefore, all image information of the document D are guided to the CCD sensor 14 by moving the first carriage 11 along the length direction of the document D. The electric signal outputted from the CCD sensor 14 is an analog signal, and converted to a digital signal by a not-shown A/D converter, and stored temporarily in a not-shown image memory as an image signal.

As explained above, the image of the document D placed on the document table 15 is converted by the CCD sensor 14 to an 8-bit digital image signal, for example, showing the light and shade of the image for every line along the first direction in which the mirror 18a is extended, in a not-shown image processing unit.

The printer unit 20 has a light scanning unit 21 as an exposing unit to be explained later with reference to FIGS. 2A and 2B and 3, and an electrophotographic image forming apparatus 22 capable of forming an image on a recording paper P, or an image forming medium.

At a predetermined position of the image forming apparatus 22, a drum-like (cylindrical) photoconductor 23 (hereinafter, indicated as a photoconductor drum) is provided, which is rotated by a main motor to be explained by referring to FIG. 3 so that an optional position is moved at a predetermined speed, and an electrostatic latent image corresponding to the image data, or the image of the document D is formed by radiating a laser beam L from the light scanning unit 21. The photoconductor is not necessarily cylindrical, but may be like a belt, for example.

Around the photoconductor drum 23, there are provided a charging unit 24 which gives the surface of the photoconductor drum 23 a surface potential with a predetermined polarity, a developing unit 25 which develops an electrostatic latent image formed by the light scanning unit on the photoconductor drum 23 by selectively supplying toner as a visualizing material, a transfer unit 26 which transfers a toner image formed by the developing unit 25 on the outer circumference of the photoconductor drum 23 to a recording paper P by giving a predetermined electric field to the toner image, a separator unit 27 which releases the recording paper P transferred with the toner image and the toner between the paper P and the photoconductor drum 23 from electrostatic absorption to the photoconductor drum 23, and separates them from (the photoconductor drum 23), and a cleaning unit 28 which eliminates the residual transfer toner remained on the outer circumference of the photoconductor drum 23, and returns the potential distribution in the photoconductor drum 23 to the state before the surface potential is supplied by the charging unit 24. The charging unit 24, the developing unit 25, the transfer unit 26, the separator unit 27 and the cleaning unit 28 are arranged sequentially along the arrow direction in which the photoconductor drum 23 is rotated. The laser beam L from the light scanning unit 21 is radiated at a predetermined position X on the photoconductor drum 23 between the charging unit 24 and the developing unit 25.

The image signal read from the document D by the scanner unit 10 is converted to a printing signal after the contour is compensated or the gradation is adjusted to be able to display halftone by a not-shown image processing unit. The printing signal is further converted to a laser modulation signal to change the light intensity of the laser beam radiated from a semiconductor laser element provided in the light scanning unit 21 as explained later, to one of the intensity able to record a latent image on the outer circumference of the photoconductor drum 23 given the predetermined surface potential by the charging unit 24, and the intensity unable to record the latent image.

Each semiconductor laser element shown below of the light scanning unit 21 is modulated in the laser beam intensity according to the above-mentioned laser modulation signal, and emits light to record an electrostatic latent image at a predetermined position in the photoconductor drum 23 corresponding to a predetermined image data. The light from the semiconductor laser element is deflected by a deflecting unit explained later in the light scanning unit 21, in a first direction same as the direction of the reading line of the scanner unit 10, and radiated at the predetermined position X on the outer circumference of the photoconductor drum 23.

Thereafter, by the rotation of the photoconductor drum 23 in the arrow direction at a predetermined speed, the first carriage 11 and second carriage 12 of the scanner unit 10 are moved along the document table 15, and the laser beam radiated from each semiconductor laser element and deflected sequentially by the deflecting unit is exposed at a predetermined interval on the outer circumference of the photoconductor drum 23 for every line.

As described above, an electrostatic latent image corresponding to an image signal is formed on the outer circumference of the photoconductor drum 23.

The electrostatic latent image formed on the outer circumference of the photoconductor drum 23 is developed by the toner from the developing unit 25, carried by the rotation of the photoconductor drum 23 to the position opposite to the transfer unit 26, and transferred by the electric field from the transfer unit 26 on the recording paper P, which is taken out one by one from a paper cassette 29 by a paper feed roller 30 and a separation roller 31, and supplied after the timing is matched by an aligning roller 32.

The recording paper P transferred with the toner (toner image) is separated together with the toner by the separation unit 27, and guided to a fixing unit 34 by a carrying unit 33.

Guided to the fixing unit 34, the toner (toner image) of the recording paper P is fixed by the heat and pressure from the fixing unit 34, and the paper P is ejected to a tray 36 through a paper ejection roller 35.

After the toner image (toner) is transferred to the recording paper P by the transfer unit 26, the photoconductor drum 23 is opposite to the cleaning unit 28 as a result of the successive rotation, and the transfer toner remained on the outer circumference (residual toner) is eliminated, and returned to the initial state before the surface potential is supplied from the charging unit 24, accepting the next image forming.

By repeating the above-mentioned process, an image is formed continuously.

As described above, the document D set on the document table 15 is read the image information by the scanner unit 10, the read image information is converted to a toner image by the printer unit 20, outputted to the recording paper P, and copied on the paper.

In the above description of the image forming apparatus, a digital copier is taken as an example, but a printer without an image reader may be used.

Figure 2A:
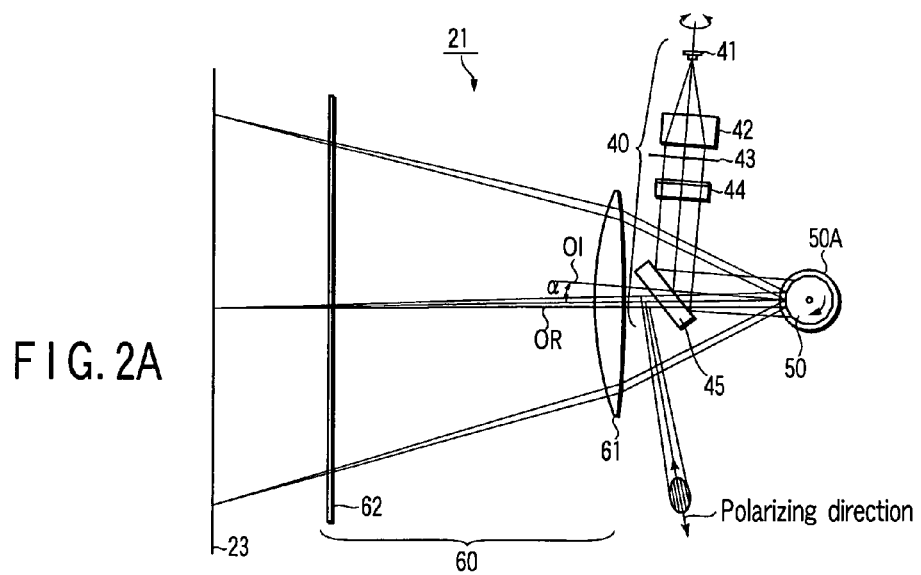
FIGS. 2A and 2B are schematic illustrations explaining a light scanning unit incorporated in the image forming apparatus shown in FIG. 1.
Figure 2B:
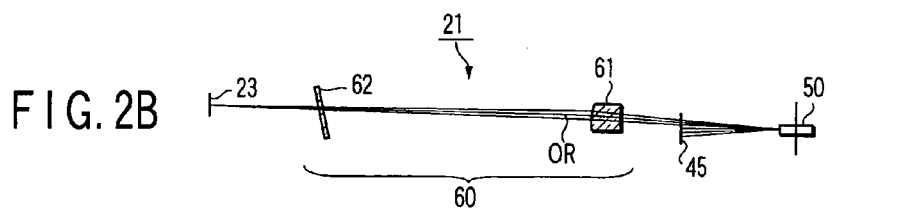

FIGS. 2A and 2B are schematic illustrations explaining a configuration of the light scanning unit shown in FIG. 1.

FIG. 2A is a schematic top plan view showing the optical elements arranged between the light source (semiconductor laser element) and photoconductor drum (scanning object) included in the light scanning unit, viewed from the direction orthogonal to a main scanning direction (a first direction) parallel to the direction of scanning the light beam from the optical deflecting unit (polygon mirror) toward the photoconductor drum by the optical deflecting unit, and explaining a loop-back with mirrors as a developed view. FIG. 2B is a schematic sectional view showing that a subsidiary scanning direction (a second direction) orthogonal to the direction shown in FIG. 2A, or the main scanning direction, becomes plane.

As shown in FIGS. 2A and 2B, the light scanning unit 21 includes a light source 41 to emit light with a predetermined wavelength, a light deflecting unit 50 to deflect the light from the light source in a predetermined direction, a pre-deflection optics 40 to guide the light from the light source to the light deflecting unit 50, and an image forming optics 60 to form an image of the light beam deflected by the light deflecting unit 50 on the photoconductor drum 23 under predetermined conditions.

The pre-deflection optics 40 has at least one of a finite focus lens to adjust the cross section shape of the light beam L emitted from the light source 41 to predetermined shape and size (a lens which converts light to a converging light), a lens which is a collimator lens or a lens which converts light to a divergent light 42, an aperture 43 to limit the light quantity (luminous flux diameter) of the laser beam L passing through the lens 42 to predetermined quantity, a cylindrical lens 44 which is given a positive power only in a subsidiary scanning direction to adjust the cross section shape of the laser beam L whose light quantity is limited to a predetermined shape by the aperture 43, and a mirror 45 to bend the laser beam L whose cross section shape is adjusted by the cylindrical lens 44 in a predetermined direction. The light source 41 is a semiconductor laser element to emit a laser beam (light beam) L of 780 nm, for example.

The laser beam L given the predetermined cross section shape by the pre-defection optics 40 is deflected (continuously reflected) by the polygon mirror (light deflecting unit) 50, which is formed in one body with at least one reflecting surface and a polygon mirror motor 50A rotatable on the reflecting surface at a predetermined speed, toward the photoconductor drum (scanned surface) 23 positioned in a later stage, or scanned almost linearly along a predetermined direction.

Between the polygon mirror 50 and photoconductor drum 23, an image forming optics 60 is provided, which forms an image of the laser beam L reflected continuously on each reflecting surface of the polygon mirror 50, almost linearly along the axis of the photoconductor drum 23.

The image forming optics 60 includes an image forming lens 61 (usually, called a fθ lens) capable of providing the convergence given a predetermined relationship based on the rotation angle of the polygon mirror 50, and a dustproof glass 62 to prevent the toner, dust or paper dust floating in the image forming unit 22 from flowing into a not-shown housing of the light scanning unit 21. As to the laser beam L reflected continuously by the optics 60 on each reflecting surface of the polygon mirror 50, the position on the photoconductor drum 23 shown as an exposure position X in FIG. 1 when radiated to the photoconductor drum 23, is in proportion to the rotation angle on each reflecting surface of the polygon mirror 50. Further, the laser beam L is shaped to have a predetermined cross section diameter at any position in the length of the photoconductor drum 23, between one end and the other end in the length (axis) direction of the photoconductor drum 23, and the image of the laser beam is formed on the photoconductor drum 23.

The optical path of the laser beam L from the semiconductor laser element 41 in the light scanning unit 21 to the photoconductor drum 23 is bent by a not-shown plurality of mirrors in a not-shown housing of the light scanning unit 21. When the main scanning direction of the image forming lens 61, the curvature in the subsidiary scanning direction, and the optical path between the polygon mirror 50 and photoconductor drum 23 are optimized, at least one of the image forming lens 61 and the not-shown plurality of mirrors may be formed in one body.

Further, in the light scanning unit shown in FIGS. 2A and 2B, when the axis $O_I$ along which the main light of the incident laser beam directed to each reflecting surface of the polygon mirror is scanned, and the optical axis $O_R$ of the image forming optics 60 are projected on the main scanning plane, the angle α formed by the two axes is 5°. When viewing the light scanning unit from the cross section of the subsidiary scanning direction, the angle formed by the incident laser beam and the optical axis $O_R$ of the image forming optics is 2°.

FIG. 3 is a schematic block diagram showing an example of a driving circuit of a digital copier including the light scanning unit shown in FIGS. 2A and 2B.

A CPU 101 as a main control unit is connected with a ROM (Read Only Memory) 102 storing predetermined operation rules and initial data, a RAM 103 to store temporarily the input control data, a common (image) RAM 104 which holds the image data from the CCD sensor 14 or the image data supplied from an external unit, and outputs the image data to an image processing circuit described below, an NVM (Nonvolatile Memory) 105 with a battery backup to hold the stored data even when power supply to the copier 1 is interrupted, and an image processing unit 106 which adds a predetermined image processing to the image data stored in the image RAM 104, and outputs the processed image data to a laser driver to be explained below.

The CPU 101 is also connected with a laser driver 121 which causes the semiconductor laser element 41 of the light scanning unit 21 to emit light, a polygon motor driver 122 to drive the polygon motor 50A which rotates the polygon mirror 50, and a main motor driver 123 which drives a main motor 23A for driving the photoconductor drum 23 and accompanied paper (transferred material) carrying mechanism.

In the light scanning unit 21 shown in FIGS. 2A and 2B, the divergent laser beam L emitted from the semiconductor laser element 41 is converted by the collimator lens 42, so that the cross section shape of the beam becomes convergent or substantially parallel (rarely divergent).

The laser beam L with the cross section shape converted to be a predetermined shape passes through the aperture 43, and the luminous flux width (luminous flux diameter) and light quantity are set to optimum, and a predetermined convergence is given by the cylindrical lens 44 only in the subsidiary scanning direction. Thus, the laser beam L becomes linear extending in the main scanning direction on each reflecting surface of the polygon mirror 50.

The polygon mirror 50 is formed to be a regular dodecahedron, for example, and its inscribed circle diameter Dp is 29 mm. The width Wp in the main scanning direction of each reflecting surface (12 surfaces) of the polygon mirror 50 is obtained by the equation Wp=tan(π/N)×Dp, assuming the number of reflecting surfaces of the polygon mirror 50 to be N. In this example, Wp=tan(π/12)×29=7.77 mm.

Contrarily, the beam width $D_L$ in the main scanning direction of the laser beam L radiated to each reflecting surface of the polygon mirror 50 is about 32 mm, which is set wide compared with the width Wp=7.77 mm in the main scanning direction on each reflecting surface of the polygon mirror 50.

The laser beam L guided to each reflecting surface of the polygon mirror 50 and scanned (deflected) linearly by being continuously reflected by the rotation of the polygon mirror 50, is given by the image forming lens 61 of the image forming optics 60 a predetermined image forming characteristic that the beam section diameter becomes almost uniform at least in the main scanning direction on the photoconductor drum 23 (image surface), and the image is formed almost linearly on the surface of the photoconductor drum 23.

The image forming lens 61 performs correction, so that the rotation angle of each reflecting surface of the polygon mirror 50 becomes proportional to the image forming position of the light beam formed on the photoconductor drum 23, that is, the scanning position. Therefore, the speed of the light beam scanned linearly on the photoconductor drum 23 by the image forming lens 61 becomes constant in all scanning areas. The image forming lens 61 is given the curvature (curvature in the subsidiary scanning direction) capable of correcting a scanning position shift in the subsidiary scanning direction caused by that the reflecting surfaces of the polygon mirror 50 are not parallel in the subsidiary scanning direction, that is, influenced by the inclination on each reflecting surface. The image forming lens 61 further corrects the image surface curve in the subsidiary scanning direction. To correct these optical characteristics in the subsidiary scanning direction, the curvature in the subsidiary scanning direction is changed depending on the scanning positions.

The shape of the lens surface of the image forming lens 61 is defined by the TABLE 1 shown below and the equation (1).

$$X = \frac{CUY*y^2 + CUZ*z^2}{1+\sqrt{1-AY*CUY^2*y^2 - AZ*CUZ^2*z^2}} + \sum_{n=0}\sum_{m=0} A_{mn} y^m z^{2n} \quad (1)$$

Where, y indicates the main scanning direction, z indicates the subsidiary scanning direction, and x indicates the optical axis direction, respectively.

TABLE 1

Incident surface

| CUY | CYZ | AY | AZ |
|---|---|---|---|
| −5.672E−03 | −4.660E−03 | 1 | 1 |

| | | | m | | | |
|---|---|---|---|---|---|---|
| n | 0 | 1 | 2 | 3 | 4 | 5 |
| 0 | 0.000E+00 | 2.787E−03 | 1.980E−03 | 1.335E−07 | 1.044E−07 | −2.786E−11 |
| 1 | 4.553E−03 | 1.328E−06 | −2.476E−07 | 5.778E−10 | 9.129E−11 | −1.236E−14 |
| 2 | 5.619E−06 | −7.489E−09 | −8.817E−10 | 1.685E−12 | −6.660E−14 | −5.188E−16 |

| | | m | | | |
|---|---|---|---|---|---|
| n | 6 | 7 | 8 | 9 | 10 |
| 0 | −7.059E−12 | 3.692E−15 | 1.841E−16 | −6.741E−20 | −1.779E−20 |
| 1 | −7.811E−15 | −2.800E−18 | 3.600E−19 | 6.332E−22 | 8.659E−24 |
| 2 | 9.075E−18 | 1.148E−19 | 5.498E−21 | −5.670E−24 | −3.951E−25 |

Emitting surface

| CUY | CYZ | AY | AZ |
|---|---|---|---|
| 5.092E−03 | 1.651E−02 | 1 | 1 |

| | | | m | | | |
|---|---|---|---|---|---|---|
| n | 0 | 1 | 2 | 3 | 4 | 5 |
| 0 | 0.000E+00 | −1.071E−03 | −8.388E−04 | 1.647E−07 | 5.067E−08 | −2.561E−11 |
| 1 | 3.809E−03 | 9.143E−07 | −3.924E−07 | 5.036E−10 | 4.401E−11 | −2.248E−14 |
| 2 | 2.945E−06 | −4.016E−09 | −1.720E−10 | 2.644E−13 | −3.675E−14 | −4.145E−17 |

| | | m | | | |
|---|---|---|---|---|---|
| n | 6 | 7 | 8 | 9 | 10 |
| 0 | −4.086E−12 | 1.397E−15 | 1.539E−16 | 1.951E−19 | −4.158E−20 |
| 1 | −5.812E−16 | 4.130E−18 | −1.228E−19 | 2.809E−22 | 9.314E−24 |
| 2 | −1.222E−17 | 1.238E−20 | 3.609E−21 | 1.408E−24 | 7.214E−26 |

The image forming lens 61 is made of acryl (PMMA), and the refractive index n is n=1.483987 with respect to a laser beam with the wavelength of 780 nm. The thickness of the image forming lens 61 is 24 mm in the defocusing direction on the optical axis (the laser beam advancing direction), and the height in the subsidiary scanning direction is 25 mm.

By using the above-mentioned image forming lens 61, the rotation angle θ of each reflecting surface of the polygon mirror 50 is almost proportional to the position of the laser beam L on the photoconductor drum 23 where the image is formed, and the position of forming the image of the laser beam L on the photoconductor drum 23 can be corrected.

Further, the image forming lens 61 can correct positional shifts in the subsidiary scanning direction caused by the deviation of inclination of each reflecting surface of the polygon mirror 50 in the subsidiary scanning direction, that is, the variation in the surface inclination quantity.

In detail, by making the relation between the laser beam incident surface (in the polygon mirror 50) and exit surface (in the photoconductor drum 23) of the image forming lens 61 optically conjugative, even if the inclination defined between an optional reflecting surface of the polygon mirror 50 and the rotation axis of the polygon mirror 50 is different (for each reflecting surface), the image forming lens 61 can correct the scanning position shifts in the subsidiary scanning direction of the laser beam L guided to the photoconductor drum 23.

The beam section diameter of the laser beam L depends on the wavelength of the light beam L radiated from the semiconductor laser element 41, and the beam section diameter of the laser beam L can be further reduced by setting the wavelength of the laser beam L to 650 nm, 630 nm or shorter 400 nm, for example.

Further, in the light scanning unit shown in FIGS. 2A and 2B, a multi-beam system which applies multiple laser beams to the image forming lens 61 is used, it is desirable to define the lens surface of the image forming lens 61 by the equation (2) in which an odd number term is included in the degree of the aspheric surface term Z in the equation (1).

$$X = \frac{CUY * y^2 + CUZ * z^2}{1 + \sqrt{1 - AY * CUY^2 * y^2 - AZ * CUZ^2 * z^2}} + \sum_{n=0}\sum_{m=0} A_{mn} y^m z^n \quad (2)$$

Where, y indicates the main scanning direction, z indicates the subsidiary scanning direction, and x indicates the optical axis direction, respectively.

Contrarily, the folding mirror 62 consists only of plane. Thus, only the image forming lens 61 assumes correction of the surface inclination to correct the influence of the inclination accuracy of each reflecting surface of the polygon mirror 50. The shape of the lens surface of the image forming lens 61 may be that of a lens, which is given a rotational symmetry shaft with respect to the main scanning axis, and has a curvature different in the subsidiary scanning direction depending on the scanning positions, like a toric lens, for example.

By using a lens which is given a rotational symmetry shaft with respect to the main scanning axis, and has a different refraction force in the subsidiary scanning direction depending on the scanning positions, as an image forming lens 61, the scanning line curve can be corrected. Further, when the curved surface in the subsidiary scanning direction has a rotational symmetry shaft, the degree of freedom of the curvature in the subsidiary scanning direction can be corrected with higher accuracy than the expanse.

Figure 4:
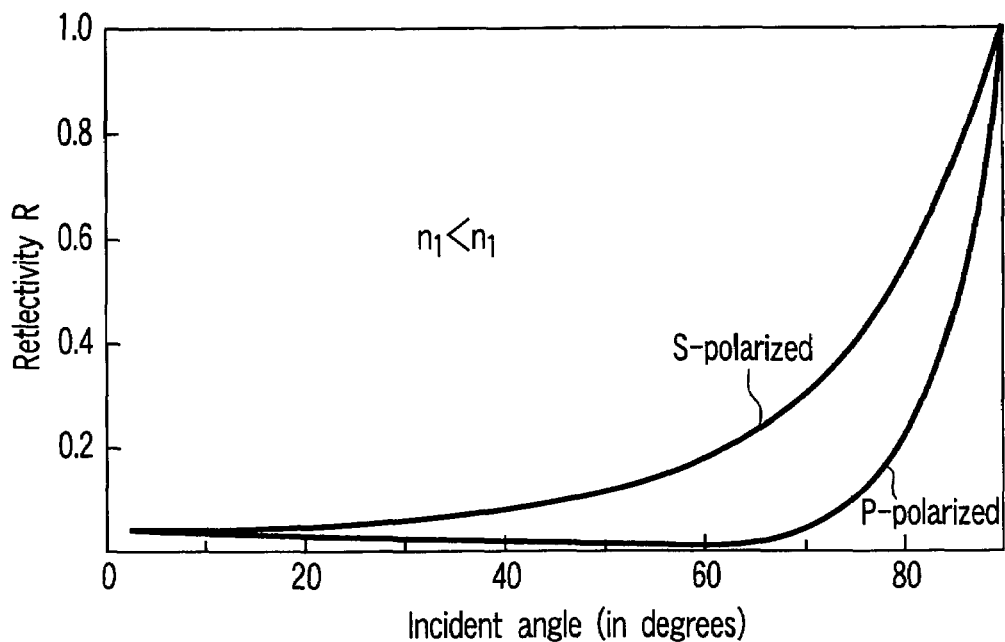
FIG. 4 is a graph explaining the transmissivity of a plastic lens incorporated in the light scanning unit shown in FIGS. 2A and 2B.

It is known that the lens transmissivity is the largest when the incident angle is perpendicular, and becomes smaller as the angle (incident angle) of the incident surface against a normal increases, as shown in FIG. 4.

Namely, in the image forming lens 61, the transmissivity becomes small at the end of scanning (the end of the main scanning direction). Thus, the light quantity difference between the center and end of the main scanning direction increases, causing a difference in the image density.

Provision of antireflection coating on the lens surface to prevent the light quantity difference in the main scanning direction has been put into practical use. But, in a plastic lens, as the lens surface is deformed by a high temperature when evaporating the antireflection coating, the optical characteristic is degraded as already explained. It is substantially impossible to set the lens surface shape before evaporation considering the deformation of the lens surface due to the heat when evaporating the antireflection coating.

Now, description will be given on a light scanning unit which can suppress the light quantity difference at the end of scanning caused by using a plastic image forming lens.

Figure 5:
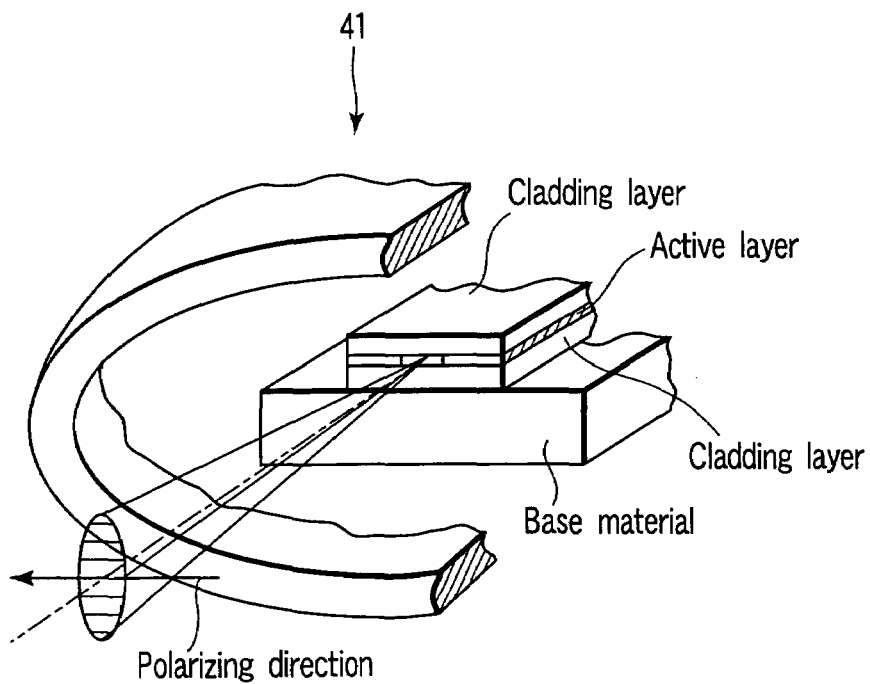
FIG. 5 is a schematic illustration explaining the characteristics of a laser beam radiated from a semiconductor laser element incorporated in the light scanning unit shown in FIGS. 2A and 2B.

FIG. 5 explains the characteristics of the laser beam emitted from the light source of the light scanning unit shown in FIGS. 2A and 2B.

As shown in FIG. 5, the polarizing direction of the laser beam (light beam, or luminous flux) L emitted from the semiconductor leaser element (light source) 41 is a linearly polarized light in the direction parallel to the direction of the junction surface of a semiconductor element, or the active layer surface between a cladding layer (lower layer) and a cladding layer (upper layer) arranged at predetermined positions on a base material. It is also well known that the light beam L is elliptic in the cross section and divergent, and the light-emitting angle is small in the direction horizontal to the junction surface (the direction parallel to the junction surface) and large in the direction vertical to the junction surface.

In many cases, in the light scanning unit as shown in FIGS. 2A and 2B, the junction surface of the semiconductor laser unit 41 is directed to the direction orthogonal to the main scanning direction considering the resolving power, so that the beam diameter becomes small in the main scanning direction and large in the subsidiary scanning direction.

In this case, the laser beam polarizing direction is linear and parallel to the subsidiary scanning direction. Therefore, the polarizing direction of the laser beam passing through the image forming lens 61 and directed to the photoconductor drum 23 is S-polarized.

However, as explained before by referring to FIG. 4, in the laser beam entering a plastic lens at a large incident angle, the transmissivity of the P-polarized light is higher than the S-polarized light. Therefore, assuming that the laser beam polarizing direction at the time when entering the image forming lens 61 is not parallel to the subsidiary scanning direction (the second direction) orthogonal to the main scanning direction (the first direction), that is, the angle made between the polarizing direction and the subsidiary scanning surface is $\alpha$, the fluctuation of the light quantity caused by the deviation of the transmissivity at the scanning position of the lens 61 can be reduced by rotating the junction surface of the laser element 41, or the outside package 41a, so that the relationship of $\alpha \neq 0$ is established and the P-polarized component increases.

Figure 6:
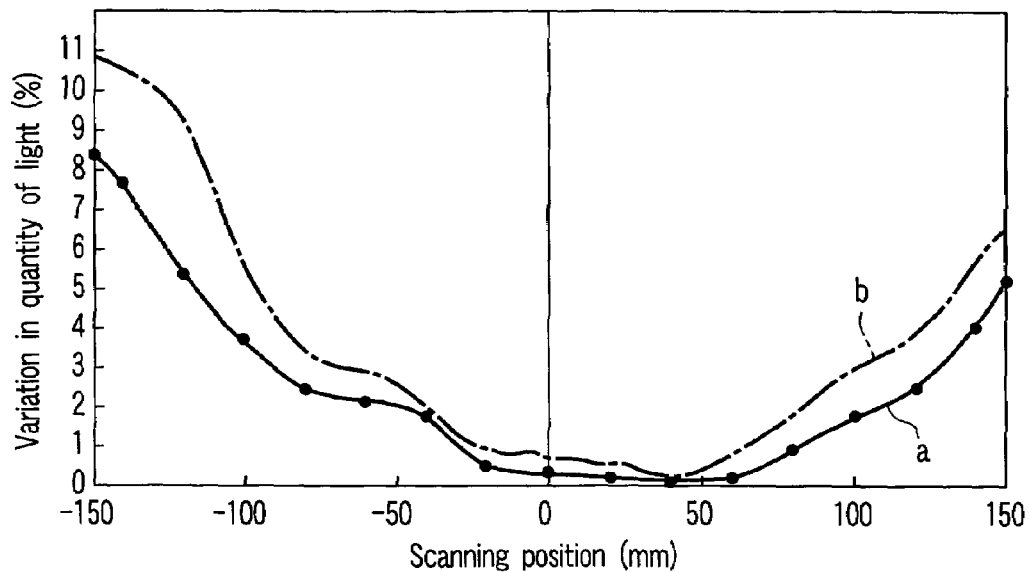
FIG. 6 is a graph explaining the variation in the quantity of light on a photoconductor drum, when using a laser beam obtained by changing the direction of a polarizing plane when entering an image forming lens, in the light scanning unit shown in FIGS. 2A and 2B.

FIG. 6 shows the variation in the scanning position and light quantity in the main scanning direction when the laser element of the light scanning unit shown in FIGS. 2A and 2B is rotated to change the polarizing surface direction, so that the polarizing surface direction of the laser beam emitted from the laser element shifts from the S-polarized light at the time when entering the image forming lens, that is, the P-polarized light component increases more than the S-polarized light component. In FIG. 6, "−" corresponds to one end side of the photoconductor drum 23 in FIG. 2A, and "+" corresponds to the other end of the same drum 23.

In FIG. 6, the curve a indicates the variation in the light quantity when the laser beam polarizing direction is adjusted by rotating the polarizing surface direction of the laser beam emitted from the laser element, so that the P-polarized light component increases at the timing when entering the image forming lens 61. The curve (chain line) b indicates the case where the laser beam polarizing direction is the subsidiary scanning direction (ordinary arrangement), for the purpose of comparison.

As obvious from FIG. 6, it is recognized that the variation in light quantity is decreased in all areas of the scanning position. At one end of scanning where the light quantity variation is likely to occur particularly, the variation is improved by about 3%. This value (the reduced variation) is useful to stabilize the image density of a halftone image in particular.

Figure 7A:
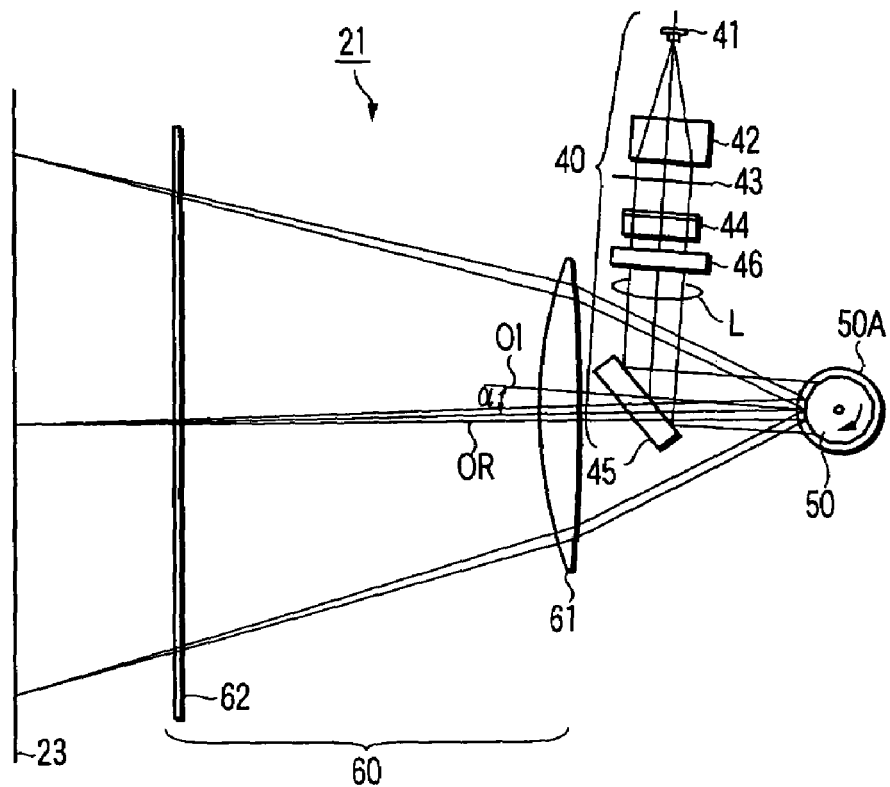
FIGS. 7A and 7B are schematic illustrations explaining an example of a light scanning unit different from the light scanning unit explained by using FIGS. 2A and 2B.
Figure 7B:
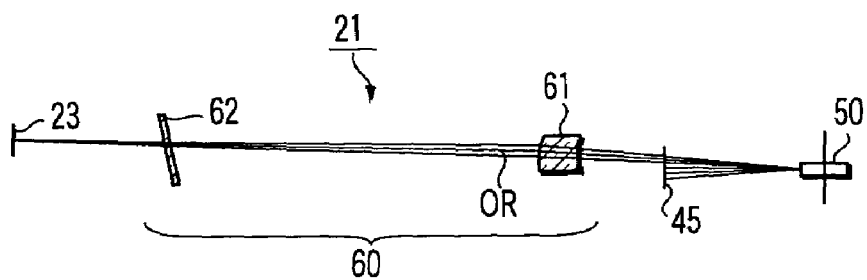

FIGS. 7A and 7B show another embodiment of a light scanning unit incorporated in the image forming apparatus shown in FIG. 1. The same reference numerals are given to the same components as those in FIGS. 2A and 2B, and the detail explanation will be omitted.

As shown in FIGS. 7A and 7B, a light scanning unit 21 includes a pre-deflection optics 40, a semiconductor laser element 41, a light deflecting unit 50 and an image forming optics 60.

The pre-deflection optics 40 has, in addition to the semiconductor laser element 41, a lens 42 which is one of a finite focusing lens, a collimator lens and a divergent lens, an aperture 43, a cylindrical lens 44, a mirror 45, and a retardation plate (retarder) 46 capable of changing the polarizing direction of the laser beam emitted from the laser element 41.

The retardation plate (retarder) 46 converts a light beam polarized linearly, that is, the polarizing direction of the laser beam from the laser element 41, to a circularly polarized light, or rotates it by a predetermined angle, as well known.

Therefore, as explained before with reference to FIGS. 4 and 5, it is possible to set the polarizing direction of the laser beam entering the image forming lens 61 so that the P-polarized component increases more than the S-polarized component. As a retardation plate (retarder) 46, $\lambda/2$ and $\lambda/4$ are generally used widely, but either retarder can be used in the light scanning unit explained with reference to FIGS. 7A and 7B.

For example, when a $\lambda/2$ retarder is used, the rate of S-polarized component and P-polarized component is reversed, and the P-polarized component increases in the polarizing direction of the laser beam entering the image forming lens 61, in the above-mentioned type light scanning unit that is usually set to the S-polarizing (when entering the lens 61), considering the resolving power.

When a λ/2 retarder is used, the laser beam polarizing direction is converted to circular. In this case, the reflection at the optical element located nearer to the photoconductor drum 23 than the retarder (reduction of transmissivity) is suppressed, the variation in the light quantity of the light beam guided to the photoconductor drum 23 in the main scanning direction is suppressed.

Figure 8:
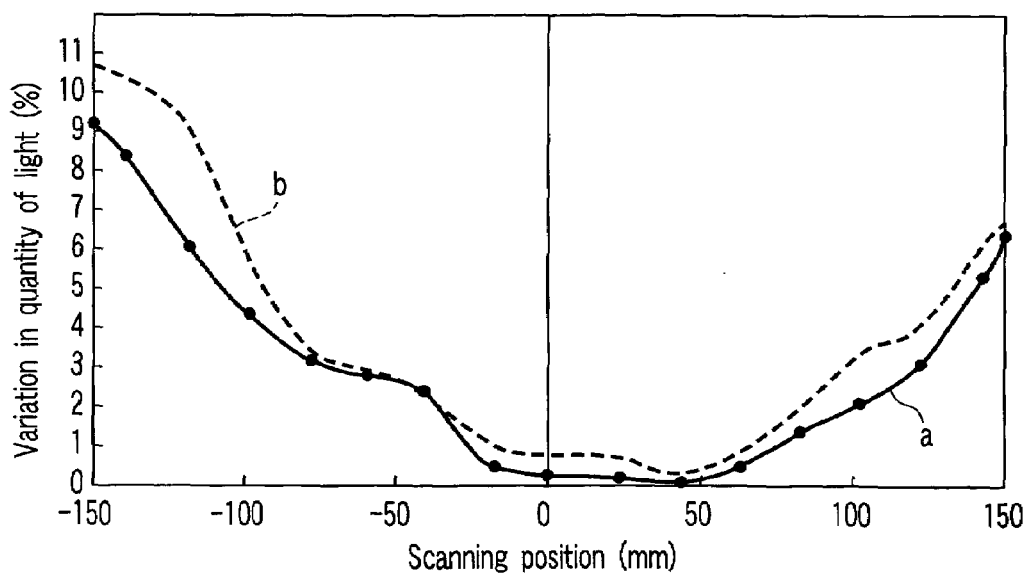
FIG. 8 is a graph explaining improvement of variation in the quantity of light on a photoconductor drum, by the light scanning unit shown in FIGS. 7A and 7B.

FIG. 8 shows the variations in the scanning position and light quantity of the laser beam guided to the photoconductor drum by the light scanning unit shown in FIGS. 7A and 7B.

In FIG. 8, "−" corresponds to one end side of the photoconductor drum 23 in FIG. 7A, and "+" corresponds to the other end of the same drum 23.

In FIG. 8, the curve a indicates the variation in the light quantity at the main scanning position when using a laser beam whose polarizing direction is changed by the λ/2 retarder. The curve (chain line) b indicates the case where the laser beam polarizing direction is the subsidiary scanning direction (ordinary arrangement), for the purpose of comparison.

As obvious from FIG. 8, it is recognized that the variation in light quantity is reduced in all areas of the scanning position. At one end of scanning where the light quantity variation is likely to occur in particular, the variation is improved by about 2%. This value (the reduced variation) is useful to stabilize the image density of a halftone image in particular.

As explained hereinbefore, according to the present invention, the degree of change in the light quantity on the scanned surface (on a photoconductor) depending on the scanning positions, peculiar to an over-illumination type light scanning unit, is reduced, whereby the density difference in an image occurred when forming an image is reduced. Particularly, the change in the density of a halftone image can be suppressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light scanning unit comprising:
   a first optics which shapes the cross section of a luminous flux emitted from a light source to a predetermined shape;
   a light deflecting unit which has at least one reflecting surface, and deflects the luminous flux shaped by the first optics in a first direction, wherein the length of the luminous flux including a polarizing light along the first direction is wider than the length of the one reflecting surface along the first direction; and
   a second optics which forms an image of the luminous flux deflected in the first direction by the light deflecting unit on a scanning object, wherein
   the second optics to which the luminous flux is guided with the polarizing direction is not parallel to a second direction orthogonal to the first direction.

2. The light scanning unit according to claim 1, wherein the first optics includes a lens whose power is different in the first direction and the second direction.

3. The light scanning unit according to claim 2, wherein the light source includes a laser diode.

4. The light scanning unit according to claim 3, wherein an angle made between a layer interposed between cladding layers of the laser diode and the second direction is not parallel.

5. The light scanning unit according to claim 3, wherein the laser diode is configured to rotate the polarizing direction of the luminous flux, to polarize the luminous flux in the second optics in a predetermined direction.

6. The light scanning unit according to claim 1, further comprising a retarder member which is configured to direct the luminous flux polarizing direction to a predetermined direction in the previous stage second optics.

7. The light scanning unit according to claim 6, wherein the first optics includes a lens whose power is different in the first direction and the second direction.

8. The light scanning unit according to claim 7, wherein the light source includes a laser diode.

9. The light scanning unit according to claim 8, wherein an angle made between a layer interposed between cladding layers of the laser diode and the second direction is not parallel.

10. An image forming apparatus comprising:
    an image holder which is configured to hold an image corresponding to distribution of light by changing a predetermined electric potential when light is radiated in a state given with the electric potential;
    an exposing unit which has a light source capable of emitting light whose polarizing direction is linear and linearly polarized light is directed to a predetermined direction, a first optics which shapes the cross section of a luminous flux emitted from the light source to a predetermined shape, a light deflecting unit which has at least one reflecting surface and deflects the luminous flux shaped by the first optics in a first direction, a second optics which forms an image of the luminous flux deflected in the first direction by the light deflecting unit at a scanning object, wherein the light scanning unit in which the length of the luminous flux deflected by the light deflecting unit along the first direction is wider than the length of the one reflecting surface of the light deflecting unit along the first direction, and the polarizing direction of the luminous flux guided to an image forming optics is not parallel to a second direction orthogonal to the first direction; and
    a developing unit which makes the image held by the image holder visible.

11. The image forming apparatus according to claim 10, wherein the second optics of the exposing unit includes a lens made of plastic.

12. The image forming apparatus according to claim 11, the linear polarizing direction of the luminous flux emitted from the light source of the exposing unit is rotated with the rotating of the light source.

13. The image forming apparatus according to claim 11, further comprising a polarizing direction changing unit which changes the polarizing direction of the linearly polarized light from the light source of the exposure unit.

* * * * *